United States Patent
Xu et al.

(10) Patent No.: US 12,256,454 B2
(45) Date of Patent: Mar. 18, 2025

(54) FAILURE HANDLING FOR SECONDARY CELL

(71) Applicant: Apple Inc., Cupertino, CA (US)

(72) Inventors: Fangli Xu, Beijing (CN); Chunhai Yao, Beijing (CN); Clive E. Rodgers, Palo Alto, CA (US); Dawei Zhang, Saratoga, CA (US); Haijing Hu, Los Gatos, CA (US); Haitong Sun, Cupertino, CA (US); Wei Zeng, Saratoga, CA (US); Yuqin Chen, Beijing (CN); Yushu Zhang, Beijing (CN); Zhibin Wu, Los Altos, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/755,483

(22) PCT Filed: Nov. 4, 2019

(86) PCT No.: PCT/CN2019/115258
§ 371 (c)(1),
(2) Date: Apr. 29, 2022

(87) PCT Pub. No.: WO2021/087644
PCT Pub. Date: May 14, 2021

(65) Prior Publication Data
US 2024/0172310 A1 May 23, 2024

(51) Int. Cl.
*H04W 76/19* (2018.01)
*H04W 16/28* (2009.01)
(Continued)

(52) U.S. Cl.
CPC ........... *H04W 76/19* (2018.02); *H04W 16/28* (2013.01); *H04W 72/1263* (2013.01); *H04W 72/56* (2023.01); *H04W 74/0833* (2013.01)

(58) Field of Classification Search
CPC ..... H04B 7/022; H04B 7/0695; H04W 76/19; H04W 16/28; H04W 72/1263; H04W 72/56; H04W 74/0833
See application file for complete search history.

(56) References Cited

U.S. PATENT DOCUMENTS

| | | | |
|---|---|---|---|
| 2015/0003336 A1* | 1/2015 | Singh | H04W 76/15 370/329 |
| 2018/0110066 A1* | 4/2018 | Luo | H04L 1/00 |

(Continued)

FOREIGN PATENT DOCUMENTS

| | | |
|---|---|---|
| CN | 109168196 | 1/2019 |
| CN | 110022607 | 7/2019 |

(Continued)

OTHER PUBLICATIONS

Vivo, "RAN2 specification impacts of SCell BFR", 3GPP TSG RAN WG2, R2-1909781, Aug. 16, 2019, 6 sheets.

(Continued)

*Primary Examiner* — Benjamin H Elliott, IV
(74) *Attorney, Agent, or Firm* — Fay Kaplun & Marcin, LLP

(57) ABSTRACT

A user equipment (UE) is connected to a wireless network and operates in a carrier aggregation (CA) state that includes a first connection to a primary cell and a second connection to a secondary cell. The UE determines a beam failure has occurred for one of the first connection or the second connection and initiates a beam failure recovery (BFR) operation. The BFR operation includes transmitting, to the primary cell, a BFR Medium Access Control (MAC) Control Element (CE).

16 Claims, 5 Drawing Sheets

(51) Int. Cl.
*H04W 72/1263* (2023.01)
*H04W 72/56* (2023.01)
*H04W 74/0833* (2024.01)

(56) References Cited

U.S. PATENT DOCUMENTS

| | | | |
|---|---|---|---|
| 2019/0053288 A1* | 2/2019 | Zhou | H04L 27/2692 |
| 2019/0215896 A1* | 7/2019 | Zhou | H04B 7/0456 |
| 2019/0253941 A1* | 8/2019 | Cirik | H04W 36/0069 |
| 2019/0274098 A1* | 9/2019 | Cheng | H04L 5/0025 |
| 2020/0145280 A1* | 5/2020 | Cirik | H04W 72/21 |
| 2020/0259703 A1* | 8/2020 | Cirik | H04L 5/0048 |
| 2020/0344834 A1* | 10/2020 | Harada | H04B 7/088 |
| 2020/0350973 A1* | 11/2020 | Cirik | H04W 74/0833 |
| 2020/0351841 A1* | 11/2020 | Cirik | H04W 48/08 |
| 2020/0367079 A1* | 11/2020 | Chen | H04W 72/04 |
| 2021/0021321 A1* | 1/2021 | Liu | H04B 7/088 |
| 2021/0067229 A1* | 3/2021 | Ryu | H04W 72/23 |
| 2021/0091844 A1* | 3/2021 | Koskela | H04B 7/0695 |
| 2023/0353220 A1* | 11/2023 | Cirik | H04W 24/08 |
| 2023/0361846 A1* | 11/2023 | Liu | H04W 76/18 |
| 2024/0022929 A1* | 1/2024 | Xu | H04W 76/19 |
| 2024/0030993 A1* | 1/2024 | He | H04W 72/046 |
| 2024/0049083 A1* | 2/2024 | Cirik | H04B 7/0695 |
| 2024/0063882 A1* | 2/2024 | Agiwal | H04W 76/19 |
| 2024/0172310 A1* | 5/2024 | Xu | H04B 7/0695 |

FOREIGN PATENT DOCUMENTS

| | | |
|---|---|---|
| CN | 110249683 | 9/2019 |
| WO | 2019/087360 | 5/2019 |
| WO | 2019/096394 | 5/2019 |
| WO | 2019/136631 | 7/2019 |
| WO | 2019/137472 | 7/2019 |
| WO | 2019/154418 | 8/2019 |
| WO | 2019/192019 | 10/2019 |

OTHER PUBLICATIONS

Lenovo et al., "SCell Beam Failure Recovery Procedure", 3GPP TSG RAN WG2, R2-1912690, Oct. 3, 2019, 4 sheets.
ZTE, Saneships, Consideration on Beam Failure recovery for Scell, 3GPP TSG RAN WG2, R2-1910404, Aug. 16, 2019, 5 sheets.
Qualcomm Incorporated, "Procedures and MAC CE design for BFR for SCells" 3GPP TSG-RAN WG2 Meeting #107bis, R2-1913833, Oct. 18, 2019, 5 sheets.
Ericsson, "MAC aspects of BFR on SCell", 3GPP TSG-RAN WG2 #107bis Tdoc, R2-1913012, Oct. 18, 2019, 6 sheets.
Mediatek Inc., "Support BFR for SCell", 3GPP TSG-RAN WG2 Meeting #107bis, R2-1913240, Oct. 18, 2019, 9 sheets.

* cited by examiner

FAILURE HANDLING FOR SECONDARY CELL

BACKGROUND

A user equipment (UE) may establish a connection to at least one of multiple different networks or types of networks. In some networks, signaling between the UE and a base station of the network may occur over the millimeter wave (mmWave) spectrum. Signaling over the mmWave spectrum may be achieved by beamforming which is an antenna technique used to transmit or receive a directional signal. However, in some instances the beam may fail for a variety of reasons, e.g., UE orientation, UE mobility, environmental conditions such as obstructions, etc. When a beam failure occurs, the UE will typically provide information to the network or base station for the purposes of a beam failure recovery (BFR) operation so that transmissions may continue.

Networks that implement mmWave spectrum may also use carrier aggregation (CA) where the UE communicates with multiple base stations to increase throughput. In a typical carrier aggregation scenario, a first base station acts as a primary cell (PCell) and one or more further base stations act as secondary cells (SCell). Just as in a single cell scenario, the PCell or SCell may experience beam failure and the UE will inform the network of the failure and implement BFR operations for communications to continue.

SUMMARY

Some exemplary embodiments include a method performed by a user equipment (UE) connected to a wireless network and operating in a carrier aggregation (CA) state comprising a first connection to a primary cell and a second connection to a secondary cell. The method includes determining a beam failure has occurred for the second connection and initiating a beam failure recovery (BFR) operation, The BFR operation includes transmitting, to the primary cell, a BFR Medium Access Control (MAC) Control Element (CE).

Further exemplary embodiments include a user equipment (UE) that has a transceiver configured to establish a connection between the UE and a wireless network, the connection comprising a first connection to a primary cell and a second connection to a secondary cell. The UE also has a processor configured to determine a beam failure has occurred for one of the first connection or the second connection and initiate a beam failure recovery (BFR) operation, wherein the BFR operation comprises instructing the transceiver to transmit, to the primary cell, a BFR Medium Access Control (MAC) Control Element (CE).

Still further exemplary embodiments include an integrated circuit having first circuitry configured to establish a connection between the UE and a wireless network, the connection comprising a first connection to a primary cell and a second connection to a secondary cell, second circuitry configured to determine a beam failure has occurred for one of the first connection or the second connection and third circuitry configured to initiate a beam failure recovery (BFR) operation, wherein the BFR operation comprises transmitting, to the primary cell, a BFR Medium Access Control (MAC) Control Element (CE).

DETAILED DESCRIPTION

Figure 1:
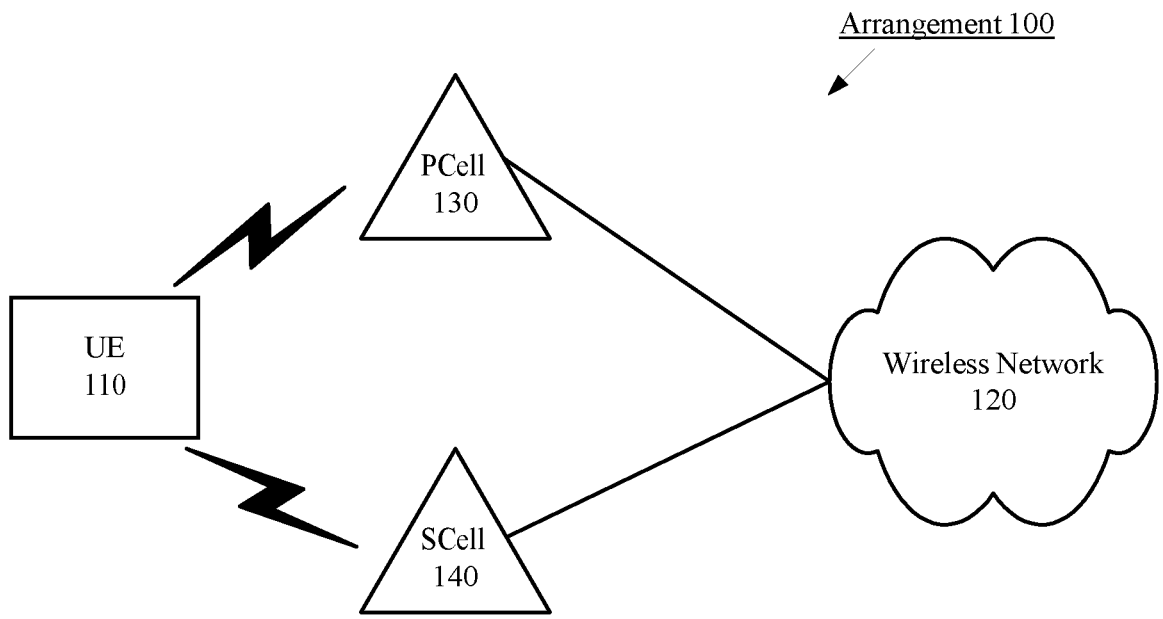
FIG. 1 shows an exemplary arrangement including a UE that is communicating wirelessly with a wireless network according to various exemplary embodiments.

The exemplary embodiments may be further understood with reference to the following description and the related appended drawings, wherein like elements are provided with the same reference numerals. The exemplary embodiments describe manners of performing a beam failure recovery (BFR) operation when a beam failure occurs between the UE and a secondary cell (e.g., an SCell).

Beamforming is an antenna technique that is utilized to transmit or receive a directional signal. From the perspective of a transmitting device, beamforming may refer to propagating a directional signal. From the perspective of a receiving device, beamforming may refer to tuning a receiver to listen to a direction of interest.

Carrier aggregation (CA) is a technique where a first device such as a UE communicates with multiple based stations to increase throughput. A first base station may be referred to as a PCell and communication between the PCell and the UE typically includes both control information and data communications. One or more second base stations may be referred to as SCells and communication between the SCell and the UE typically includes data communications. This delineation of the types of communications between the UE and the PCell and SCells is only exemplary and different types of networks may include different types of communications.

The exemplary embodiments are described with regard to a first device being a user equipment (UE). However, the use of a UE is provided for illustrative purposes. The exemplary embodiments may be utilized with any electronic component that is configured with the hardware, software, and/or firmware to perform beamforming. Therefore, the UE as described herein is used to represent any electronic component that is capable of beamforming.

The exemplary embodiments are also described with regard to the base stations being a next generation Node B (gNB) of a 5G New Radio (NR) network. The UE and the 5G NR network may communicate via the gNB over the millimeter wave (mmWave) spectrum. The mmWave spectrum is comprised of frequency bands that each have a wavelength of 1-10 millimeters. The mmWave frequency bands may be located between, approximately, 10 gigahertz (GHz) and 300 GHz. However, the use of the gNB, the 5G NR network and mmWave spectrum is provided for illustrative purposes. The exemplary embodiments may be utilized in any network arrangement that utilizes beam forming.

Establishing and/or maintaining a communication link over the mmWave spectrum may include a process referred to as beam management. Beam management is performed to align a transmitter beam and a receiver beam to form a beam pair that may be utilized for a data transfer. The performance of the beam pair may correlate to the accuracy of the alignment between the transmitter beam and the receiver beam. For any of a variety of different factors, the beam pair may become misaligned and a beam failure may occur.

When a beam failure occurs, the UE and the network will perform operations related to beam failure recovery (BFR). The BFR operation may generally include the UE informing the network of the failure and informing the network of another beam that is available for communication between the gNB and the UE. Any reference to BFR is for illustrative purposes. Different networks and/or entities may refer to similar concepts by different names.

The exemplary embodiments relate to various manners of performing a BFR operation when the beam that fails is between the UE and a secondary cell. The various manners of operation include the UE sending a message to the wireless network via the primary cell that indicates the secondary cell for which the beam has failed and an available beam to use with the secondary cell for recovery purposes. As will be described in greater detail below, the exemplary embodiments provide multiple manners for the UE to send the message to the wireless network.

FIG. 1 shows an exemplary arrangement 100 including a UE 110 that is communicating wirelessly with a wireless network 120 according to various exemplary embodiments. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The wireless network 120 includes a first gNB acting as a PCell 130 and a second gNB acting as an SCell 140. Those skilled in the art will understand that each of the gNBs 130 and 140 may act as either a PCell or an SCell for multiple UEs at the same time and may also act as the only base station that is currently communicating with one or more UEs. The PCell and SCell designations are used to identify the current connections between the network 120 and the UE 110. Thus, throughout this description, the gNB 130 and 140 may be referred to as gNBs or as their current functionality with respect to the UE 110, e.g., PCell 130 or SCell 140. In addition, in some networks, the same gNB may act as both the PCell and the SCell. The exemplary embodiments may be implemented in any of the above network configurations or any other network configuration including a PCell or SCell.

The wireless network 120 may be a 5G NR-RAN that may be a portion of one or more cellular networks that may be deployed by cellular providers (e.g., Verizon, AT&T, Sprint, T-Mobile, etc.). As described above, the exemplary embodiments are concerned with a BFR operation when there is a beam failure between the UE 110 and the SCell 140.

Those skilled in the art will understand that any association procedure may be performed for the UE 110 to connect to the wireless network 120. For example, as discussed above, the wireless network 5G 120 may be associated with a particular cellular provider where the UE 110 and/or the user thereof has a contract and credential information (e.g., stored on a SIM card). Upon detecting the presence of the wireless network 120, the UE 110 may transmit the corresponding credential information to associate with the wireless network 120. More specifically, the UE 110 may associate with a specific base station (e.g., the gNB 130 of the wireless network. The UE 110, as part of the association procedure, may indicate the capabilities of the UE 110 to the wireless network 120. These capabilities may include the CA capability. When the wireless network 120 understands that the UE 110 includes the CA capability, the wireless network 120 may set up the CA configuration as shown in FIG. 1, e.g., the gNB 130 acting as a PCell and the gNB 140 acting as an SCell. Again, the wireless network 120 may assign multiple SCells for the connection between the UE 110 and the wireless network 120, but for illustrative purposes it will be assumed that the current connection only incudes a single SCell 140.

Figure 2:
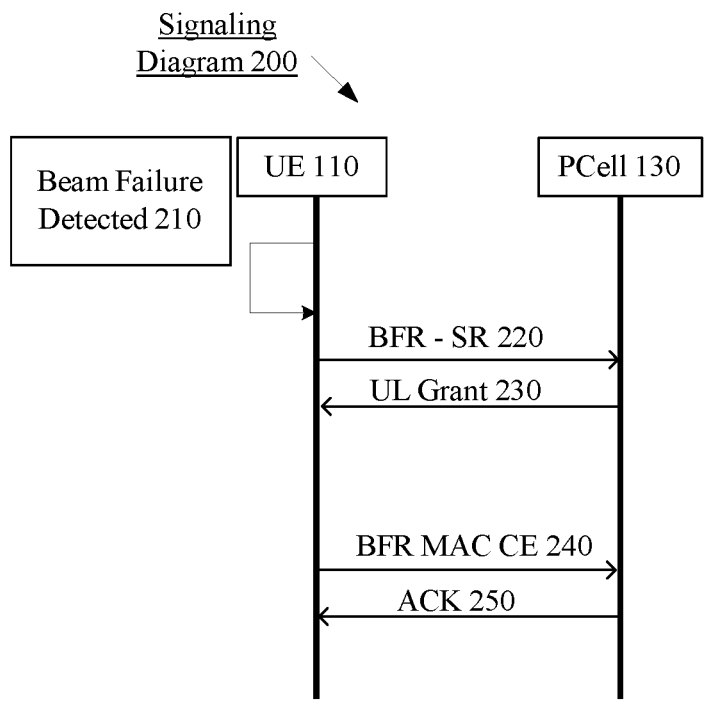
FIG. 2 shows a first exemplary signaling diagram showing a BFR operation when there is a beam failure between the UE and the SCell according to various exemplary embodiments.

FIG. 2 shows a first exemplary signaling diagram 200 showing a BFR operation when there is a beam failure between the UE 110 and the SCell 140 according to various exemplary embodiments. The exemplary signaling diagram 200 will be described with regard to the network arrangement 100 of FIG. 1. While the beam failure has occurred between the UE 110 and the SCell 140, the communication shown in the signaling diagram 200 is between the UE 110 and the PCell 130 because, it is assumed, that the communication link between these two devices remains available. In another exemplary embodiment, the communications illustrated between the UE 110 and the PCell 130 may be between the UE 110 and another SCell (not shown) where a beam failure has not occurred. For example, if the CA connection is configured with two (2) SCells and a first of the SCells experiences a beam failure, the communications shown in FIG. 2 may be between the UE 110 and the SCell that has not experienced the beam failure. This is true for the communications shown and/or described with respect to FIG. 2, but also applies to the communications shown and/or described with reference to FIGS. 3-6.

In 210, the UE 110 determines that a beam failure has occurred between the UE 110 and the SCell 140. Those skilled in the art will understand that there are various manners that the UE 110 may use to determine a beam failure. In some exemplary embodiments, the UE 110 will implement a beam failure detection (BFD) procedure to determine a beam failure has occurred. However, the exemplary embodiments are not limited to any specific manner of determining beam failure.

In the next available scheduling request (SR) for BFR operations (BFR-SR 220), the UE 110 will inform the wireless network 120 that a beam failure has occurred by requesting an uplink grant. It should be understood that in 5G-NR network implementations, there are scheduled BFR-SR opportunities. These scheduled BFR-SR opportunities may be referred to as dedicated failure scheduling requests. These dedicated failure scheduling requests are distinct from other types of scheduling requests (e.g., data scheduling requests) that the UE 110 may use to request an uplink grant for other purposes. Throughout this description, a service request that is not a dedicated failure scheduling request may also be referred to as a service transmission scheduling request. While this example is described with respect to a 5G-NR implementation, the exemplary embodiments may be implemented in other networks and that include concepts that are similar to the BFR-SR opportunities without having the same name.

In response to the BFR-SR 220, the network 120 (via the PCell 130) will provide the UE 110 with an uplink (UL) grant 230. Using the UL grant, the UE 110 will provide a BFR Medium Access Control (MAC) Control Element (CE) (BFR MAC CE 240) to the wireless network 120 via the PCell 130. The BFR MAC CE 240 will provide information to the wireless network 120 to assist the wireless network 120 in recovering a beam for communication between the UE 110 and the SCell 140. The information may include the identity of the SCell 140 for which the beam failure has occurred and the identify at least one other beam that is currently available for communication between the UE 110 and the SCell 140. As described above, the UE 110 may have multiple SCells and thus the BFR MAC CE 240 will identify the particular SCell for which a beam failure has occurred.

In 250, the UE 110 will receive an ACK when the BFR operation is successfully completed. The ACK 250 may take various forms. In one example, the ACK 250 may be the wireless network 120 providing a normal uplink grant to the UE 110 to schedule a new transmission for the same HARQ (Hybrid Automatic Repeat Request) process as the PUSCH (Physical Uplink Shared Channel) carrying the BFR MAC CE 240. However, the ACK 250 may take other forms and the exemplary embodiments are not limited to any specific form of ACK.

In the above signaling diagram 200, if the UE 110 has an available uplink grant (e.g., a previously scheduled data uplink grant), the UE 110 may transmit the BFR MAC CE using the available uplink grant without having to request an uplink grant using the dedicated failure scheduling request (e.g., BFR-SR 220). For example, the UE 110 may have a current uplink grant for a data transmission to the PCell 130 when the beam failure is detected. Thus, the UE 110 may use this currently available uplink grant for the BFR operation without having to wait for the next available BFR-SR.

Figure 3:
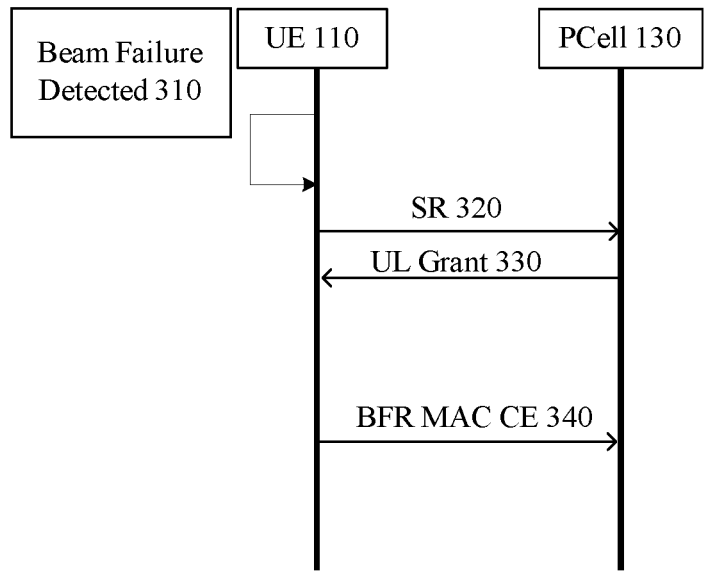
FIG. 3 shows a second exemplary signaling diagram showing a BFR operation including the UE using a data scheduling request when there is a beam failure between the UE and the SCell according to various exemplary embodiments.

FIG. 3 shows a second exemplary signaling diagram 300 showing a BFR operation when there is a beam failure between the UE 110 and the SCell 140 according to various exemplary embodiments. The exemplary signaling diagram 300 will be described with regard to the network arrangement 100 of FIG. 1. While the beam failure has occurred between the UE 110 and the SCell 140, the communication shown in the signaling diagram 300 is between the UE 110 and the PCell 130 because, it is assumed, that the communication link between these two devices remains available.

In 310, the UE 110 determines that a beam failure has occurred between the UE and the SCell 140. As described above with reference to signaling diagram 200, the UE 110 may request an uplink grant to send a BFR MAC CE for the BFR operation using a next available BFR-SR or use a currently scheduled data uplink grant to send the BFR MAC CE. However, in the scenario of signaling diagram 300, it may be considered that there are no BFR-SRs or current data uplink grants available to the UE 110. There may be various reasons for the BFR-SRs or data uplink grants not being available. For example, in one exemplary embodiment, the wireless network 120 may not be configured to include dedicated failure scheduling requests (e.g., BFR-SRs). In another example, there may be no currently scheduled uplink grants or there may be no scheduled uplink grants for a predetermined period of time. Thus, the UE 110 may use other manners of communicating the BFR MAC CE to the wireless network 120 for purposes of the BFR operation.

Thus, in 320, the UE 110 may use an available SR, e.g., a data SR rather than a BFR-SR, to request an uplink grant. It should be understood that in 5G-NR network implementations, there are scheduled SR opportunities (e.g., data SRs) between the UE 110 and the PCell 130. In one exemplary embodiment, the SR that is selected to request the uplink grant is based on selecting a logical channel (LCH) that has a highest priority. In another exemplary embodiment, the SR that is selected to request the uplink grant is the next available SR.

In response to the SR 320, the network 120 (via the PCell 130) will provide the UE 110 with a UL grant 330. Again, the UL grant 330 is a UL data grant in response to the data SR 320. Using the UL grant, the UE 110 will provide the BFR MAC CE 340 to the wireless network 120 via the PCell 130. Similar to the BFR MAC CE 240 described above, the BFR MAC CE 340 may identify the SCell 140 for which the beam failure has occurred and at least one other beam that is currently available for communication between the UE 110 and the SCell 140. While not shown in FIG. 3, the successful completion of the BFR operation for the SCell 140 may be signaled to the UE 110 using an ACK.

Figure 4:
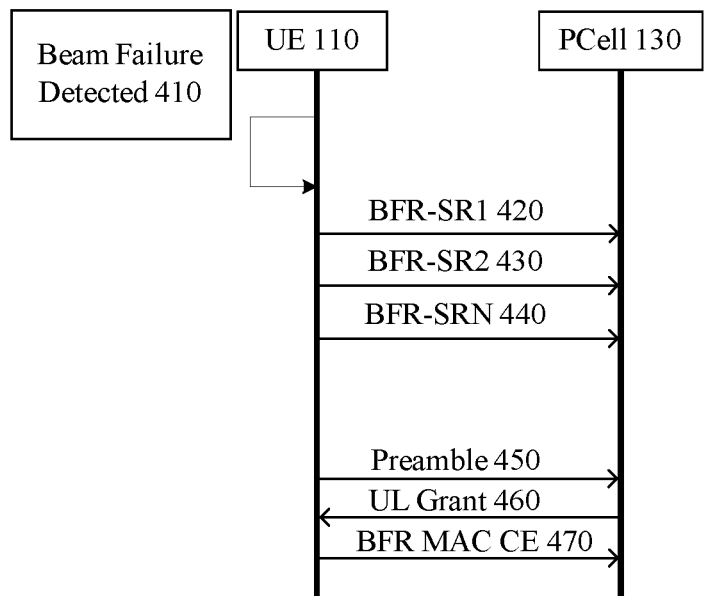
FIG. 4 shows a third exemplary signaling diagram showing a BFR operation including a failed beam failure recovery specific scheduling request when there is a beam failure between the UE and the SCell according to various exemplary embodiments.

FIG. 4 shows a third exemplary signaling diagram 400 showing a BFR operation when there is a beam failure between the UE 110 and the SCell 140 according to various exemplary embodiments. The exemplary signaling diagram 400 will be described with regard to the network arrangement 100 of FIG. 1. While the beam failure has occurred between the UE 110 and the SCell 140, the communication shown in the signaling diagram 400 is between the UE 110 and the PCell 130 because, it is assumed, that the communication link between these two devices remains available.

In 410, the UE 110 determines that a beam failure has occurred between the UE and the SCell 140. In 420, the UE 110 may use a next available BFR-SR to request an uplink grant. It may be considered in this scenario that the UE 110 does not receive an uplink grant in response to this BFR-SR1 420. Those skilled in the art will understand that there are a variety of reasons for the UE 110 not receiving an uplink grant in response to the BFR-SR1 420. In 430, the UE 110 may use a next available BFR-SR to request an uplink grant. Again, it may be considered in this scenario that the UE 110 does not receive an uplink grant in response to this BFR-SR2 430. The UE 110 may continue to send BFR-SRs up to a maximum number of attempts (e.g., BFR-SRN 440). The maximum number of BFR-SR attempts may be configured by the UE 110 or the wireless network 120.

When the UE 110 determines that all BFR-SR transmissions have failed (e.g., an uplink grant has not been received in response to any BFR-SR up to the maximum number of attempts), the UE 110 may attempt to signal the BFR MAC CE to the wireless network 120 in a different manner. For example, the UE 110 may initiate a contention-based random access (CBRA) procedure. To initiate the CBRA, the UE 110 may release all current SR configurations, all periodic sounding reference signals (SRS) and uplink configured grants. These specific operations are not shown in FIG. 4. The UE may then trigger the CBRA operation by sending a preamble 450 transmission to the PCell 130.

In response to the preamble transmission 450, the wireless network 120 via the PCell 130 will send a UL grant 460 for the CBRA procedure. Using the UL grant for the CBRA procedure, the UE 110 will provide the BFR MAC CE 470 to the wireless network 120 via the PCell 130. Similar to the BFR MAC CE 240 described above, the BFR MAC CE 470 may identify the SCell 140 for which the beam failure has occurred and at least one other beam that is currently available for communication between the UE 110 and the SCell 140. While not shown in FIG. 4, the successful completion of the BFR operation for the SCell 140 may be signaled to the UE 110 using an ACK.

Returning to the signaling diagram 300 of FIG. 3, it was considered that there were no BFR-SRs or current data uplink grants available to the UE 110. Thus, in signaling diagram 300, the UE 110 used an available data SR to request a grant for the BFR MAC CE transmission. However, the same scenario may also be resolved using the exemplary solution of signaling diagram 400. For example, instead of the BFR-SR failure as shown by the BFR-SR transmissions 420-450, it may be considered that there are no BFR-SRs or current data uplink grants available to the UE 110, similar to the scenario of FIG. 3. In such a case, the UE 110 may also trigger the CBRA procedure as shown in FIG. 4 to communicate the BFR MAC CE to the wireless network 120 for purposes of the BFR operation.

Figure 5:
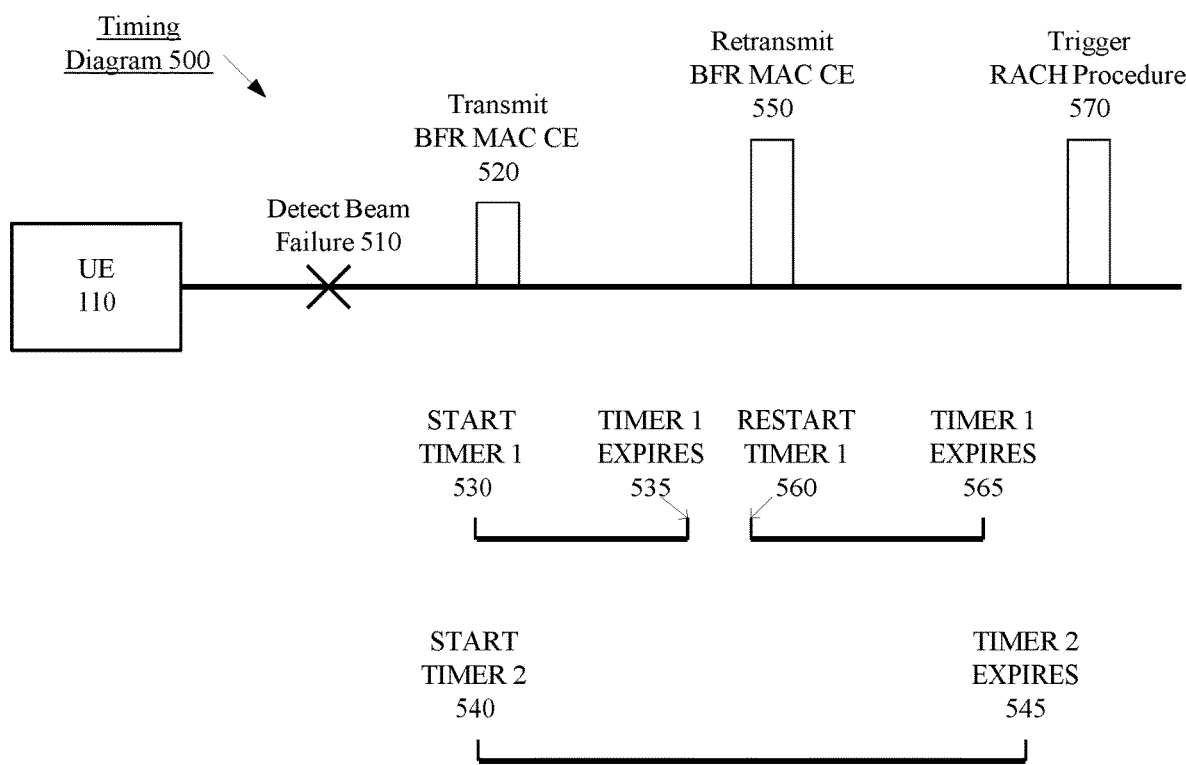
FIG. 5 shows a timing diagram for the operation of the UE 110 in sending retransmissions for the BFR operations and declaring a random access channel procedure according to various exemplary embodiments.

FIG. 5 shows a timing diagram 500 for the operation of the UE 110 in sending retransmissions for the BFR operations according to various exemplary embodiments. The timing diagram 500 shows a manner of controlling the number of retransmissions based on a timer. In this description of FIG. 5, when the term retransmission is used, it should be understood that the retransmission is referring to an independent retransmission of the BFR MAC CE and not a HARQ retransmission.

At time 510, the UE 110 detects the beam failure between the UE 110 and the SCell 140. At time 520, the UE 110 transmits the BFR MAC CE to the wireless network 120 via the PCell 130. As described above, there are various manners for the UE 110 to receive an uplink grant to send the BFR MAC CE and any of these manners may have been used to trigger the transmission at time 520. When the BFR MAC CE transmission is sent at time 520, the UE 110 may also start two timers, timer 1 at time 530 and timer 2 at time 540, where times 520, 530 and 540 are substantially simultaneous. As will be described in greater detail below, the duration of timer 1 is shorter than the duration of timer 2. In another exemplary embodiment, the times 530 and 540 for starting the corresponding timers may be based on when the UE 110 sends the SR to request the uplink grant for the BFR MAC CE transmission. The UE 110 will refrain from retransmitting the BFR MAC CE while the timer 1 continues to run, e.g., between time 530 and time 535.

If the UE 110 receives the ACK indicating that the BFR operation for the SCell 140 has successfully completed prior to the expiration of timer 1 at time 535, the UE 110 may stop timer 1 and timer 2 as the BFR operation is complete. If timer 1 expires at time 535 without successful completion of the BFR operation, the UE 110 may retransmit the BFR MAC CE at time 550. In addition, the UE 110 may restart the timer 1 at time 560 that is substantially simultaneous with time 550. The timer 2 will continue to run as will be described in greater detail below.

The retransmission of the BFR MAC CE may be accomplished in a variety of manners. In a first example, the BFR MAC CE may be retransmitted on the same type of PUSCH as the original transmission. In another example, the BFR MAC CE may be retransmitted on any type of PUSCH (e.g., Type A, Type B in 5G NR wireless networks). Moreover, the contents of the BFR MAC CE may change between transmissions. For example, in the original transmission at time 520, it may be considered that a beam X is the best available beam for use by the UE 110 and the SCell 140. Thus, information for beam X may be included in the BFR MAC CE transmission at time 520. However, at time 550, conditions may have changed, and a beam Y may be the best available beam. Thus, information for beam Y may be included in the BFR MAC CE transmission at time 550. Those skilled in the art will understand that the best available beam may be determined based on any number of factors and the exact determination is outside the scope of this disclosure.

In another exemplary embodiment, the transmission at time 550 may be determined by the UE based on the schedule between the UE 110 and the PCell 130. For example, if the next available transmission for the UE 110 is the PUSCH for the BFR MAC CE, the UE 110 will transmit the BFR MAC CE in this transmission opportunity. However, if the next available transmission for the UE 110 is the dedicated BFR-SR, the UE 110 will transmit the BFR-SR to the PCell 130 to request an uplink grant for the BFR MAC CE. In either case, the timer 1 will be restarted at time 560 corresponding to the transmission time 550.

Again, if the UE 110 receives the ACK indicating that the BFR operation for the SCell 140 has successfully completed prior to the expiration of timer 1 at time 565, the UE 110 may stop timer 1 and timer 2 as the BFR operation is complete. However, if the BFR operation is not successfully completed when the timer 1 expires at time 565, the UE 110 may perform additional retransmissions as described above.

In this example, it may be considered that the timer 2 has expired at time 545 prior to the successful completion of the BFR operation. It should be understood that the example of two (2) transmissions before the expiration of the timer 2 is only exemplary and the duration of timer 2 may be set such that any number of transmissions/retransmissions of the BFR MAC CE may occur prior to the expiration of the timer 2.

When the timer 2 expires at time 545 without successful completion of the BFR operation, the UE 110 will reset all timers and/or counters associated with the beam failure operations and trigger a random access channel (RACH) procedure at time 570. For example, the UE 110 may trigger the CBRA procedure described with reference to 450-470 of FIG. 4. In accordance with the RACH procedure, the BFR MAC CE will be transmitted by the UE 110 in the uplink grant for the RACH procedure. The RACH procedure is not required to be a contention-based procedure as a contention free RACH procedure may also be used. In this manner, the number of retransmissions of the BFR MAC CE is controlled based on a timer, e.g., timer 2. When timer 2 expires, a RACH procedure is triggered.

In the above description of FIG. 5, it may be considered that the BFR MAC CE transmissions may be referred to as dedicated failure transmissions. These dedicated failure transmissions may be considered distinct from the BFR MAC CE transmission that occurs in response to the uplink grant during the RACH procedure.

Figure 6:
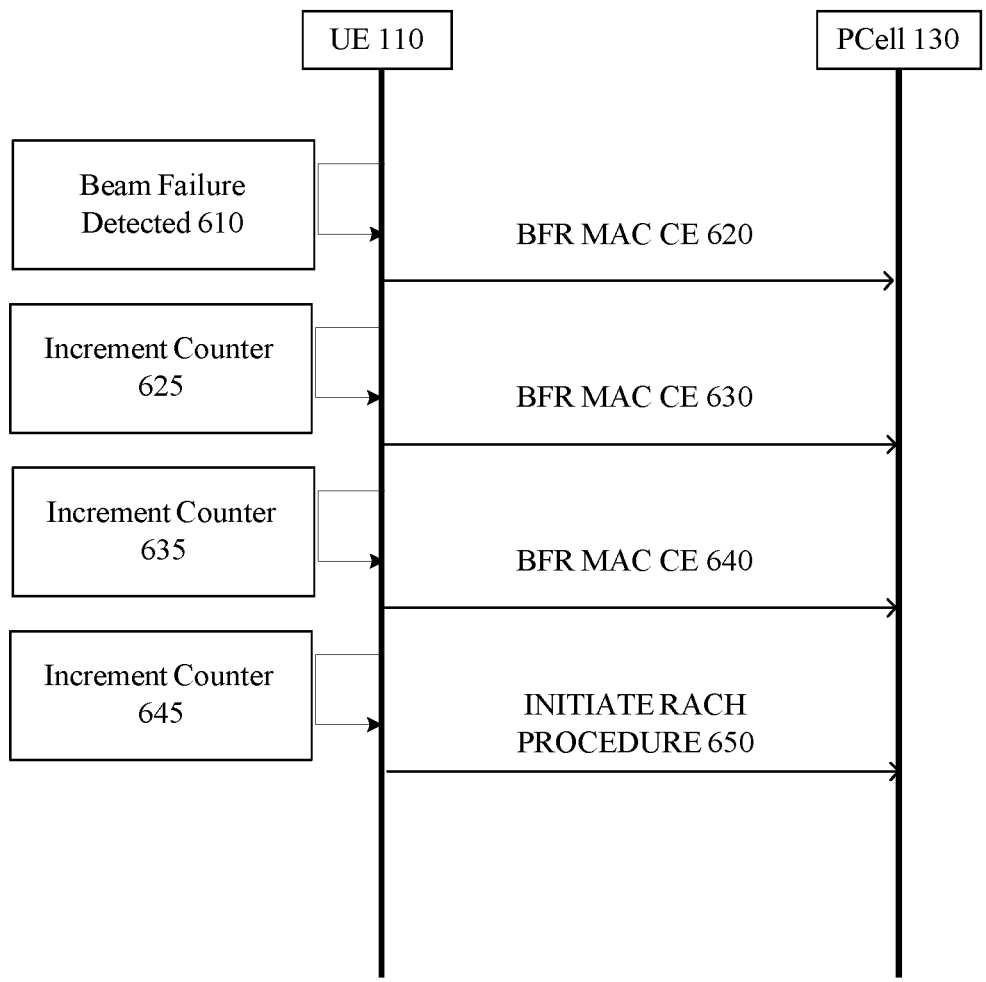
FIG. 6 shows a signaling diagram for the operation of the UE in sending retransmissions for the BFR operations including declaring the transmissions a failure according to various exemplary embodiments.

FIG. 6 shows a signaling diagram 600 for the operation of the UE 110 in sending retransmissions for the BFR operations according to various exemplary embodiments. The signaling diagram 600 shows a manner of controlling the number of retransmissions based on a counter. In this description of FIG. 6, when the term retransmission is used, it should be understood that the retransmission is referring to an independent retransmission of the BFR MAC CE and not a HARQ retransmission of any of the independent transmissions. The exemplary signaling diagram 600 will be described with regard to the network arrangement 100 of FIG. 1.

In 610, the UE 110 determines that a beam failure has occurred between the UE 110 and the SCell 140. In 620, the UE transmits the BFR MAC CE to the wireless network 120 via the PCell 130. As described above, there may be various manners of the UE 110 obtaining the UL grant to transmit the BFR MAC CE 620. Any of these manners may be used to obtain the uplink grant.

In addition to transmitting the BFR MAC CE 6201 the UE 110 may also increment a counter 625 when the transmission is sent. Since this is a first transmission of the BFR MAC CE after the detection of a beam failure, it may be considered that the counter had been reset to zero (0) and this transmission incremented the counter to one (1). In addition, when the first BFR MAC CE transmission 620 is sent, the UE 110 may also start the timer 1 as was described above with reference to FIG. 5 (not shown in FIG. 6). Again, the UE 110 will refrain from retransmitting the BFR MAC CE while the timer 1 is still running.

Upon expiration of the timer 1 without receiving an ACK to indicate the BFR operation was successful, the UE 110 will retransmit the BFR MAC CE 630, restart the timer 1 and increment the counter 635 to the next value, which in the current example will be two (2). It may be considered that the BFR MAC CE 630 transmission is not successful and the UE 110 will again retransmit the BFR MAC CE 640, restart the timer 1 and increment the counter 645 to the next value, which in the current example will be three (3).

As described above, the counter will control the number of retransmissions for the BFR MAC CE. The threshold for the counter (e.g., the maximum number of transmissions/retransmissions) may be set by the wireless network 120 or the UE 110. In this example, it may be considered that this threshold is three (3). Thus, if the timer 1 expires after BFR MAC CE 640 transmission, the UE 110 will determine that the counter has reached the threshold value. In this case, the UE 110 will not retransmit the BFR MAC CE, but will initiate a RACH procedure 650 because the maximum number of retransmission attempts has been reached. For example, the UE 110 may trigger the CBRA procedure described with reference to 450-470 of FIG. 4. In accordance with the RACH procedure, the BFR MAC CE will be transmitted by the UE 110 in the uplink grant for the RACH procedure. In this manner, the number of retransmissions of the BFR MAC CE is controlled based on a counter.

Figure 7:
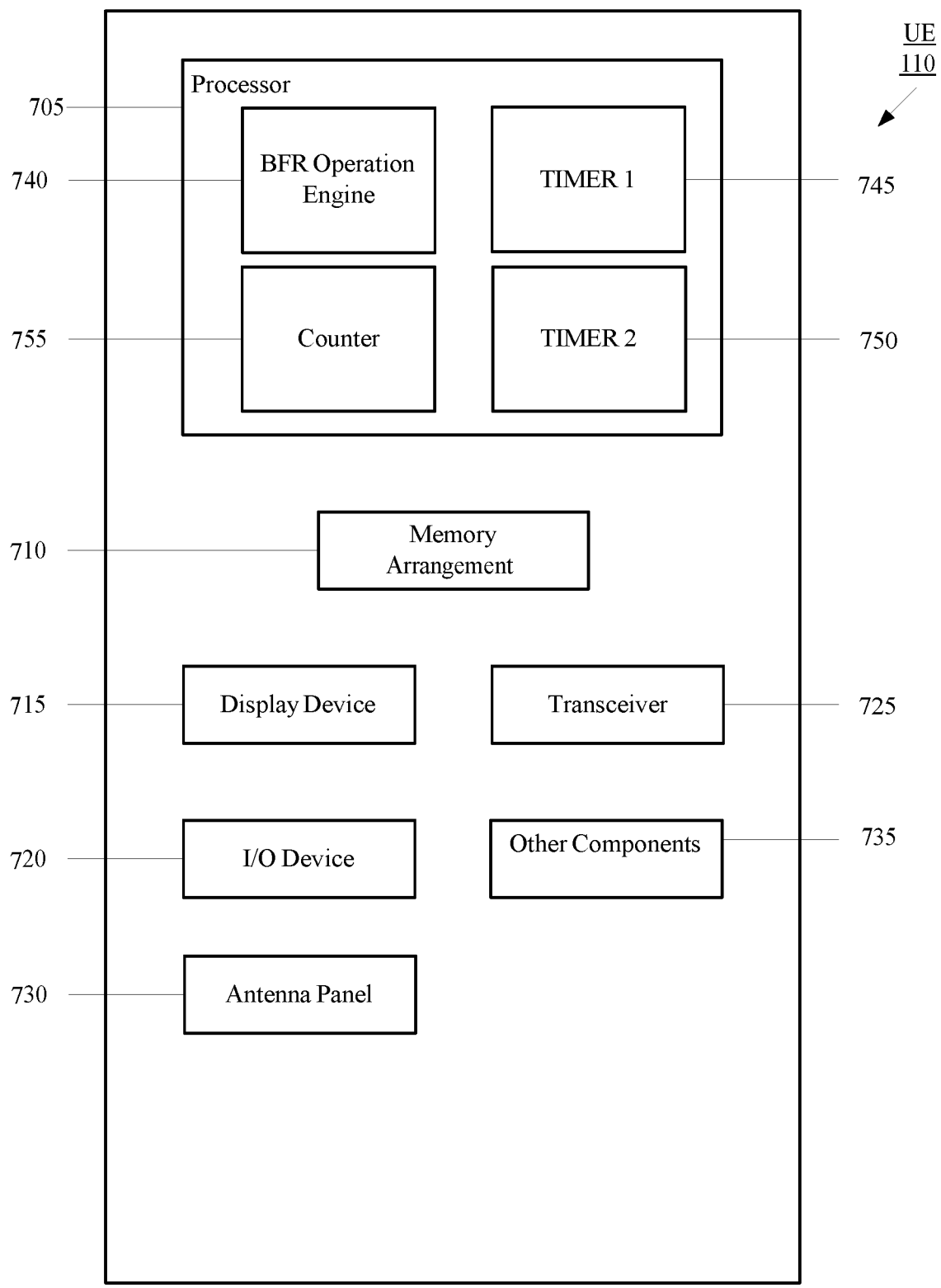
FIG. 7 shows an exemplary UE according to various exemplary embodiments.

FIG. 7 shows an exemplary UE 110 according to various exemplary embodiments. The UE 110 will be described with regard to the network arrangement 100 of FIG. 1. The UE 110 may represent any electronic device and may include a processor 705, a memory arrangement 710, a display device 715, an input/output (I/O) device 720, a transceiver 725, an antenna panel 730 and other components 735. The other components 735 may include, for example, an audio input device, an audio output device, a battery that provides a limited power supply, a data acquisition device, ports to electrically connect the UE 110 to other electronic devices, etc.

The processor 705 may be configured to execute a plurality of engines of the UE 110. For example, the engines may include a BFR operation engine 740, a first timer 745, a second timer 750 and a counter 755. The BFR operation engine 740 may perform the various signaling for the UE 110 as described with respect to the signaling diagrams of FIGS. 2-4 and 6. The timers 745 and 750 and the counter 755 may perform the timing and counting operations as described with reference to FIGS. 5 and 6.

The above referenced engines each being an application (e.g., a program) executed by the processor 705 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 705 is split among two or more processors such as a baseband processor and an applications processor. The exemplary embodiments may be implemented in any of these or other configurations of a UE.

The memory 710 may be a hardware component configured to store data related to operations performed by the UE 110. The display device 715 may be a hardware component configured to show data to a user while the I/O device 720 may be a hardware component that enables the user to enter inputs. The display device 715 and the I/O device 720 may be separate components or integrated together such as a touchscreen. The transceiver 725 may be a hardware component configured to establish a connection with the wireless network 120 (e.g., 5G NR network). Accordingly, the transceiver 725 may operate on a variety of different frequencies or channels (e.g., set of consecutive frequencies).

The above exemplary embodiments were described with reference to the beam failure occurring between the UE and the SCell. However, the exemplary embodiments may also be implemented when the beam failure is between the UE and the PCell. For example, in each of the above examples, if the beam failure occurred on the PCell, it may be considered that the SCell connection remains and the UE may communicate the BFR MAC CE via the one or more SCell(s) to perform the BFR operations for the PCell. Thus, while the exemplary embodiments were described with respect to beam failure for the SCell, the exemplary embodiments may also be implemented when there is a beam failure for the PCell.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
   at a user equipment (UE) connected to a wireless network and operating in a carrier aggregation (CA) state comprising a first connection to a primary cell and a second connection to a secondary cell:
   determining a beam failure has occurred for the second connection; and
   initiating a beam failure recovery (BFR) operation, wherein the BFR operation comprises:
   transmitting, to the wireless network, a number of dedicated failure scheduling requests;
   starting a timer when the transmission of the number of dedicated failure scheduling requests begins;
   identifying that the timer expires before the BFR operation is successful;
   releasing all sounding reference signals (SRS) in response to the identifying;
   releasing configured uplink grants in response to the identifying;
   initiating a random access channel (RACH) procedure with the primary cell in response to the identifying; and
   transmitting, to the wireless network, a BFR Medium Access Control (MAC) Control Element (CE).

2. The method of claim 1, wherein the BFR operation further comprises:
   receiving an uplink grant, wherein the BFR MAC CE is transmitted in the uplink grant.

3. The method of claim 1, wherein the BFR operation further comprises:
   receiving, from the primary cell, an uplink grant for the RACH procedure, wherein the BFR MAC CE is transmitted in the uplink grant for the RACH procedure.

4. The method of claim 3, wherein the network configures a maximum number of dedicated failure scheduling requests.

5. The method of claim 1, wherein transmitting the BFR MAC CE comprises:
   transmitting, to the wireless network, a first transmission comprising the BFR MAC CE, wherein the BFR MAC CE comprises a first set of data; and
   when the first transmission is determined to have failed, transmitting, to the wireless network, a second transmission comprising the BFR MAC CE, wherein the BFR MAC CE comprises a second set of data.

6. The method of claim 5, wherein the first set of data comprises an identification of the secondary cell and a first available beam and wherein the second set of data comprises the identification of the secondary cell and a second available beam, wherein the first available beam and the second available beam comprise one of the same beam or a different beam.

7. The method of claim 5, wherein the first transmission is determined to have failed based on at least a timer that is initiated when the first transmission is sent.

8. A user equipment (UE), comprising:
   a transceiver configured to establish a connection between the UE and a wireless network, the connection comprising a first connection to a primary cell and a second connection to a secondary cell; and
   a processor configured to determine a beam failure has occurred for one of the first connection or the second connection and initiate a beam failure recovery (BFR) operation,
   wherein the BFR operation comprises:
   instructing the transceiver to transmit, to the wireless network a number of dedicated failure scheduling requests;
   starting a timer when the transmission of the number of dedicated failure scheduling requests begins;
   identifying that the timer expires before the BFR operation is successful;
   releasing all sounding reference signals (SRS) in response to the identifying;
   releasing configured uplink grants in response to the identifying;
   initiating a random access channel (RACH) procedure with the primary cell in response to the identifying; and
   instructing the transceiver to transmit, to the wireless network, a BFR Medium Access Control (MAC) Control Element (CE).

9. The UE of claim 8, wherein the BFR operation further comprises the transceiver receiving the uplink grant, wherein the BFR MAC CE is transmitted in the uplink grant.

10. The UE of claim 8, wherein the BFR operation further comprises receiving, from the primary cell, an uplink grant for the RACH procedure, wherein the BFR MAC CE is transmitted in the uplink grant for the RACH procedure.

11. The UE of claim 8, wherein transmitting the BFR MAC CE comprises the transceiver transmitting, to the wireless network, a first transmission comprising the BFR MAC CE, wherein the BFR MAC CE comprises a first set of data and, when the first transmission is determined to have failed, transmitting, to the wireless network, a second transmission comprising the BFR MAC CE, wherein the BFR MAC CE comprises a second set of data.

12. The UE of claim 11, wherein the first set of data comprises an identification of the primary cell or the secondary cell having the beam failure and a first available beam and wherein the second set of data comprises the identification of the primary cell or the secondary cell having the beam failure and a second available beam, wherein the first available beam and the second available beam comprise one of the same beam or a different beam.

13. An integrated circuit, comprising:
   first circuitry configured to establish a connection between a user equipment (UE) and a wireless network, the connection comprising a first connection to a primary cell and a second connection to a secondary cell;
   second circuitry configured to determine a beam failure has occurred for one of the first connection or the second connection; and
   third circuitry configured to initiate a beam failure recovery (BFR) operation, wherein the BFR operation comprises:
   transmitting, to the wireless network, a number of dedicated failure scheduling requests;
   starting a timer when the transmission of the number of dedicated failure scheduling requests begins;
   identifying that the timer expires before the BFR operation is successful;
   releasing all sounding reference signals (SRS) in response to the identifying;
   releasing configured uplink grants in response to the identifying;
   initiating a random access channel (RACH) procedure with the primary cell in response to the identifying; and
   transmitting, to the wireless network, a BFR Medium Access Control (MAC) Control Element (CE).

14. The integrated circuit of claim 13, wherein the third circuitry is further configured to receive an uplink grant, wherein the BFR MAC CE is transmitted in the uplink grant.

15. The integrated circuit of claim 13, wherein the third circuitry is further configured to receive, from the wireless network, an uplink grant for the RACH procedure, wherein the BFR MAC CE is transmitted in the uplink grant for the RACH procedure.

16. The integrated circuit of claim 13, wherein the third circuitry is further configured to transmit, to the wireless network, a first transmission comprising the BFR MAC CE, wherein the BFR MAC CE comprises a first set of data and, when the first transmission is determined to have failed, transmit, to the wireless network, a second transmission comprising the BFR MAC CE, wherein the BFR MAC CE comprises a second set of data.

* * * * *